United States Patent [19]

Betzner

[11] Patent Number: 4,781,558

[45] Date of Patent: Nov. 1, 1988

[54] APPARATUS FOR MAKING AN EMBOSSED GYPSUM PANEL

[75] Inventor: William E. Betzner, St. Petersburg, Fla.

[73] Assignee: The Celotex Corporation, Tampa, Fla.

[21] Appl. No.: 911,932

[22] Filed: Sep. 26, 1986

[51] Int. Cl.[4] ........................ B28B 3/12; B28B 11/14; B29C 43/44; B29C 47/00

[52] U.S. Cl. .................................. 425/115; 264/40.1; 264/284; 425/113; 425/150; 425/224; 425/308; 425/373; 425/385

[58] Field of Search ............... 425/385, 115, 220, 373, 425/296, 113, 219, 375, 135, 150, 308, 224; 264/293, 284, 40.1

[56] References Cited

U.S. PATENT DOCUMENTS

| | | | |
|---|---|---|---|
| 584,748 | 6/1897 | Roome . | |
| 1,179,601 | 4/1916 | Ballou | 264/284 |
| 1,580,158 | 4/1926 | Neher | 264/284 |
| 1,856,932 | 5/1932 | Shaw . | |
| 1,874,922 | 8/1932 | Delaney . | |
| 2,044,234 | 6/1936 | Walper | 154/2 |
| 2,238,017 | 4/1941 | Duncan | 154/2 |
| 2,392,923 | 1/1946 | Hurd | 154/1 |
| 2,479,207 | 8/1949 | Buttress | 25/44 |
| 2,529,175 | 11/1950 | Nelson | 425/385 |
| 2,708,300 | 5/1955 | Buttress | 425/385 |
| 2,750,646 | 6/1956 | Reidenbach | 425/385 |
| 2,778,086 | 1/1957 | Wilcox | 425/385 |
| 2,991,824 | 7/1961 | Loechl | 425/373 |
| 3,233,301 | 2/1966 | Tillisch et al. | 425/385 |
| 3,532,576 | 10/1970 | Proctor et al. | 425/115 |
| 3,767,348 | 10/1973 | Perkins | 425/385 |
| 3,775,529 | 11/1973 | Steenson et al. | 425/385 |
| 3,825,393 | 7/1974 | Bittner et al. | 425/385 |
| 3,900,279 | 8/1975 | Newby | 425/385 |
| 4,028,036 | 6/1977 | Farfor | 425/385 |
| 4,256,446 | 3/1981 | Hinojosa et al. | 264/284 |
| 4,369,025 | 1/1983 | vonder Weid | 425/115 |

*Primary Examiner*—Jan H. Silbaugh
*Assistant Examiner*—Karen D. Kutach
*Attorney, Agent, or Firm*—James W. Grace; Charles W. Vanecek

[57] ABSTRACT

An apparatus for making an embossed gypsum panel on a conveyor including an embossing device mounted on a movable device such that the embossing device can be moved to the optimum location for embossing.

4 Claims, 1 Drawing Sheet

APPARATUS FOR MAKING AN EMBOSSED GYPSUM PANEL

BACKGROUND OF THE INVENTION

1. Field of the Invention

The present invention relates to building products and more particularly, to an apparatus for making decorative panels made from a hardenable gypsum slurry and a method for making said decorative panels.

2. Description of the Prior Art

Panels or tiles having an embossed surface have been available for installation in commercial and residential areas. These panels have generally been made of wood fiber, mineral wool or glass fibers in either a wet process using a fourdrinier-type machine or a molded process using a rather thick, moldable slurry. The surfaces of the panels have been embossed while the panel is in either a wet stage or after it has been dried.

Panels have also been made of a slurry which contains gypsum that hardens or sets during a drying cycle. Generally, gypsum panels have not been embossed to produce a decorative surface. Gypsum panels usually comprise a core of set gypsum covered on both sides by paper sheets and thus, the gypsum is not available for embossing. The surface of the panels are usually embossed, or have holes or fissures therein for enhanced acoustical qualities. The holes or fissures can be put into the surfaces while the product is wet or dry.

SUMMARY OF THE INVENTION

The present invention concerns an embossed gypsum panel and the process for making said panel. The panel may be a relatively low density (8 to 25 pounds per cubic foot) gypsum-based panel. However, the actual density of the panel may vary depending upon the amount of low density aggregate used. The embossing is done by an embossing drum which is locatable with respect to the "set" of the gypsum composition.

It is an object of the present invention to provide a novel process for producing an embossed gypsum panel.

It is a further object of the invention to provide a novel process for producing an embossed gypsum panel in an economical manner.

Other objects and features of the invention will become apparent to those skilled in the art when the present description is considered in the light of the accompanying drawing in which like numerals indicate like elements and in which:

FIG. 1 is a schematic layout of the essential apparatus of the invention.

DESCRIPTION OF THE PREFERRED EMBODIMENT

Figure 1:
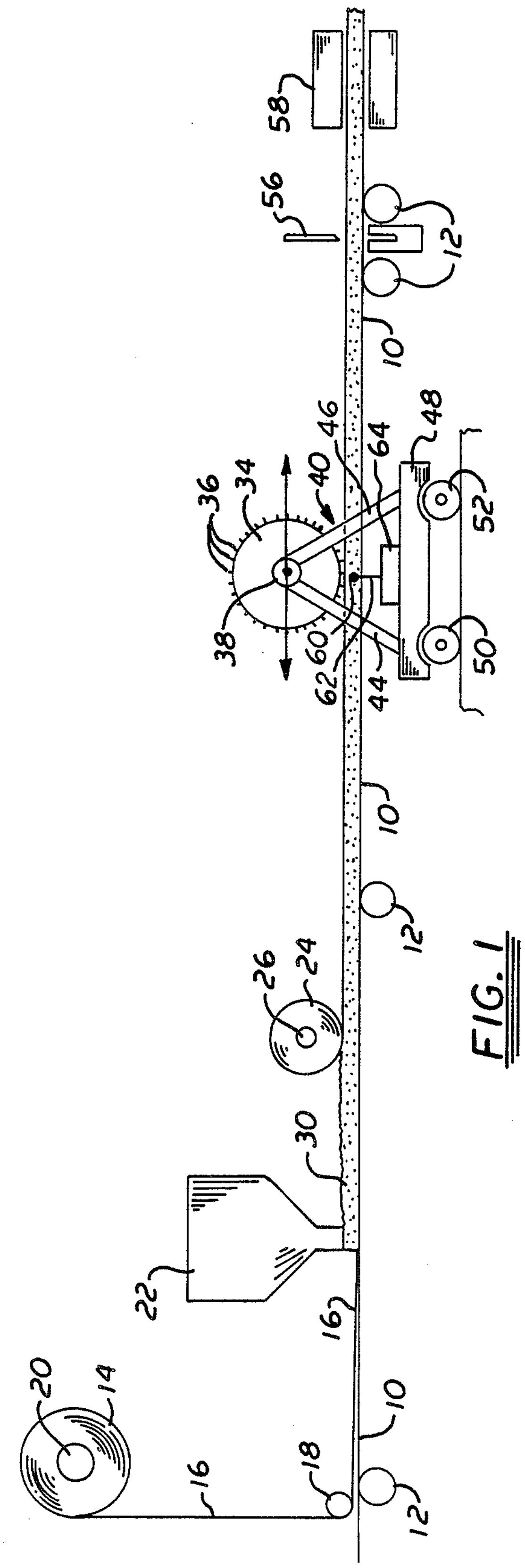

With reference to FIG. 1, there is therein shown a gypsum panel manufacturing apparatus comprising a conveyor belt or other panel moving device 10 mounted for movement on conveyor drums 12. An optional roll 14 carries a roll of backing material; such as, paper, foil or glass fiber 16. The paper, foil or glass fiber forms a sheet of predetermined width which moves over a guide roll or drum 18 and is moved along the upper surface of conveyor 10. Roll 14 may be slipped over a mandrel 20 which acts as a central axis for roll 14.

A mixer 22 is positioned over conveyor belt 10 to deposit a slurry of gypsum on sheet 16. If desired, side deckles (not shown) can be located along each side of conveyor 10 to confine the gypsum slurry in forming a continuous layer on sheet 16.

Mixer 22 may be a ball mixer, a pin mixer, a combination of both, or may be any of any other suitable type. Mixer 22 is shown schematically as depositing a single relatively wide stream of slurry designated as 30. In actual practice, a common expedient is to deposit several separate streams across the conveyor 10, the plastic streams merging by lateral gravitational flow before reaching level roll 24.

A leveling roll 24 mounted on a mandrel 26 forms a means to control the thickness of the gypsum slurry after it is deposited on sheet 16 from mixer 22. Leveling roll 24 is mounted near mixer 22 so that the slurry is leveled before any setting of the slurry occurs. The outer surface of roll 24 may be coated with Teflon or other release type material to prevent sticking of the gypsum to roll 24.

In order to provide a decorative surface on the upper face of the board, a drum or roll 34 having an embossing surface 36 is mounted downstream of level roll 24. Drum 34 is mounted for rotation on a mandrel or axle 38. Mandrel 38 is mounted on a support structure 40. Support structure 40 comprises a pair of braces 44 and 46 which are supported on a moveable vehicle 48. Vehicle 48 has wheels 50 and 52 which permit drum 34 to be moved longitudinally of conveyor belt 10 toward or away from mixer 22.

The side of mandrel 38 opposite the side shown is supported on a similar moveable vehicle by a similar support structure (not shown).

The final cutting and drying operations of the process are carried out by the cutter 56 and dryer 58 which are shown in schematic form.

The apparatus described and the operation of the apparatus is entirely conventional and therefore details of the specific mounting and drive means have been omitted.

The slurry 30 is made by adding a generated foam and/or low density aggregate such as perlite to a gypsum-based composition. Other binders, such as starch, are added to improve the strength of the final product and wax is added to improve water resistance. Fibers, such as glass fiber, can be added to improve strength and handleability.

A typical formula is as follows:

| Ingredient | Range % by Weight | Preferred % by Weight |
|---|---|---|
| Calcined gypsum | 25–60 | 40 |
| Expanded perlite | 10–40 | 26 |
| Clay | 8–36 | 24 |
| Guar gum | ½–3 | 1 |
| Glass fiber | ⅛–2 | ½ |
| Accelerator | ⅛–2 | ½ |
| Starch | 5–10 | 8 |

The clay may be K-T Ball clay. The starch may be thick boiling corn starch. The accelerator may be finely ground rehydrated gypsum $CaSO_4.2H_2O$. All ingredients are combined in an aqueous slurry at a concentration which is easily pourable (15 to 50% solids) and the slurry is deposited between moving deckles onto a moving conveyor, where it is spread out by the use of a leveling roll 24 (both the roll and the conveyor are preferably surfaced with Teflon or such so as to minimize sticking to the roll or conveyor surfaces). The slurry might also be deposited onto a sheet of paper or aluminum foil or glass fiber mat or such (instead of being put directly onto the conveyor surface) which would impart strength or other properties to the panel.

As with gypsum board manufacture, the "set" of the composition is advanced by the addition of one of several accelerator additives which cause the slurry to "set" rapidly to the optimum point where the surface is semi-hard but still soft enough to be shaped or penetrated with embossing or texturing rolls or tools, and then to retain that embossing or texturing through subsequent hardening so that the final surface retains all the patterning that was done to it.

Optimum "set" point in this process is critical because the degree of hardness of the slurry when it is subjected to patterning will greatly affect the definition of the retained pattern. If the slurry soft, it will "flow back" and lose details; if too hard, the surface will tear instead of becoming formed. At the optimum degree of set, the surface of the slurry will retain perfectly even the finest details of the pattern.

The above-mentioned optimum degree of slurry "set" is difficult to predict or maintain since even small subtle changes in raw materials or processing conditions will affect the speed of "set."

To overcome the problem of unpredictable "set" and the difficulty of patterning the surface of the panel at the optimum degree of "set," the surfacing or embossing device used is mounted (on wheels or a worm drive or a chain device) in such a way so that it can be moved up or down the length of the forming conveyor, so that the optimum condition of "set" can be found and followed if it changes because of reasons discussed earlier. Thus, if "set" conditions change and the surface is too wet, the device is moved downstream or away from the mixer until the optimum "set" is found. Likewise, if the surface is too dry, the device is moved upstream, or toward the mixer.

The degree of "set" could be monitored by an operator who would visually observe the patterning and manually move the patterning device upstream or down, as required, or this characteristic could be measured continuously by means of a thin rod 60 being pushed into the edge of the panel and withdrawn continuously by means of a plunger 62. The amount of pressure required to penetrate the panel would indicate the resistance of the mix to penetration and, therefore, the degree of "set", and the device would then move itself to where the degree of "set" was optimum by means of an automatic device 64 equipped with a "minicomputer."

Alternative devices for determining the degree of "set" may include a wheel or other device to continuously monitor the degree of "set."

Once the panel was embossed, it would be processed as are most other gypsum products in that, after it had set completely, it would be cut into pieces and then dried in a conventional manner. After drying, the pieces would be cut and/or machined to the shapes and sizes required and, finally, painted.

Various modifications of the invention as hereinbefore set forth may be made without departing from the spirit and scope thereof, and therefore, only such limitations should be made as are indicated in the appended claims.

I claim:

1. An apparatus for making an embossed gypsum panel having a predetermined pattern comprising: a mixer for making a settable gypsum slurry, a conveyor located below said mixer for receiving said gypsum slurry, a leveling means located downstream from said mixer to form a smooth surface on said gypsum slurry, means for determining the degree to which said gypsum slurry has set along said conveyor and thereby determining an optional location for embossing, an embossing means having an embossing surface for embossing a pattern into said smooth surface of said gypsum slurry, said embossing means being mounted on moveable support means for movement of said embossing means toward and away from said mixer, and means for moving said embossing means to said optimum location for embossing.

2. An apparatus for making an embossed gypsum panel as recited in claim 1 in which said apparatus includes a means for feeding a backing material on said conveyor for receiving said gypsum slurry, said feeding means being located ahead of said mixer.

3. An apparatus for making an embossed gypsum panel as recited in claim 1 in which said leveling means has a non-stick surface.

4. An apparatus for making an embossed gypsum panel as recited in claim 1 in which said embossing means comprises a drum mounted for rotation on a mandrel, said drum having an embossing pattern which is the inverse of said predetermined pattern.

* * * * *